(12) United States Patent
Hirose et al.

(10) Patent No.: US 7,360,440 B2
(45) Date of Patent: *Apr. 22, 2008

(54) SEMICONDUCTOR FORCE SENSOR

(75) Inventors: Shigeru Hirose, Toyama (JP);
Hiroyuki Sawamura, Toyama (JP);
Masato Ando, Toyama (JP);
Yoshimitsu Motoki, Toyama (JP)

(73) Assignee: Hokuriku Electric Industry Co., Ltd., Kami-Niikawagun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/763,844

(22) Filed: Jun. 15, 2007

(65) Prior Publication Data

US 2007/0234827 A1    Oct. 11, 2007

Related U.S. Application Data

(62) Division of application No. 10/510,995, filed as application No. PCT/JP03/04714 on Apr. 14, 2003, now Pat. No. 7,234,359.

(51) Int. Cl.
*G01B 7/16* (2006.01)

(52) U.S. Cl. ....................................................... 73/777
(58) Field of Classification Search .................. 73/777
See application file for complete search history.

(56) References Cited

U.S. PATENT DOCUMENTS 4,656,454 A    4/1987  Rosenberger
4,709,342 A    11/1987 Hosoda et al.
5,559,280 A    9/1996  Kovacich et al.
6,194,782 B1   2/2001  Katchmar
6,441,628 B1   8/2002  Farnworth et al.
6,491,647 B1 * 12/2002 Bridger et al. ............. 600/585
7,234,359 B2 * 6/2007  Hirose et al. ................. 73/777
2002/0005072 A1* 1/2002  Nidan et al. ................. 73/715
2005/0190152 A1* 9/2005  Vaganov ..................... 345/157

FOREIGN PATENT DOCUMENTS

| DE | 3115565 | 11/1982 |
| JP | 59-155734 | 9/1984 |
| JP | 59-195135 | 11/1984 |
| JP | 62-62478 | 4/1987 |
| JP | 63-196080 | 8/1988 |
| JP | 63-146734 | 9/1988 |
| JP | 63-146735 | 9/1988 |
| JP | 5-118935 | 5/1993 |

* cited by examiner

*Primary Examiner*—Max Noori
(74) *Attorney, Agent, or Firm*—Rankin, Hill & Clark LLP (57) ABSTRACT

A semiconductor force sensor capable of preventing a diaphragm part from being broken and accurately measuring a force applied thereto in a direction orthogonal to the diaphragm part, wherein a force transmitting device for applying a measured force to the diaphragm part of a semiconductor force sensor element is formed of a sphere having a rigidity, and a through hole passing through an opposed wall part toward the diaphragm is formed in the opposed wall parts at a position opposed to the center part of the diaphragm part so that a part of the sphere can face the outside of the opposed wall part and stores a part of the remaining part of the sphere to allow the sphere to be moved only in a direction orthogonal to the diaphragm part and rotated on the center part of the diaphragm part.

1 Claim, 5 Drawing Sheets

SEMICONDUCTOR FORCE SENSOR

TECHNICAL FIELD

The present invention relates to a semiconductor force sensor for detecting a force such as a pressure or the like by a semiconductor force sensor element, for output as an electric signal.

BACKGROUND ART

Japanese Patent Application Laid-Open Publication No. 118935/1993 discloses a semiconductor force sensor including a semiconductor force sensor element having a diaphragm section and a sphere for transmitting a force to the diaphragm section. The semiconductor force sensor warps the diaphragm section by the force applied to the sphere and converts a change in this force to an electric signal, thereby measuring the force applied to the sphere or turning on or off a switch. In the semiconductor force sensor, a recess section, in which the sphere is placed, is formed in the central portion of the semiconductor force sensor element, and a through hole, into which the sphere is fitted, is formed in the opposed wall section of an receiving case facing the recess section so that part of the sphere faces outside. With this structure, positioning of the sphere is achieved by the through hole in the opposed wall section with the sphere being secured in the semiconductor force sensor element.

In such a semiconductor force sensor, however, when a force in a direction other than a direction orthogonal to the diaphragm section is transmitted to the diaphragm section through the sphere, an undue force is applied to the diaphragm section, so that the diaphragm section might be broken. Further, a force applied to the direction orthogonal to the diaphragm section could not be measured accurately.

Japanese Utility Model Application No. 38779/1987 (Japanese Utility Model Application Laid-Open publication No. 146734/1988) relating to a microfilm discloses a pressure-sensitive sensor including a sensor element constituted by a thin plate fixed to a receiving case and a composite piezoelectric sheet having electrodes, and a sphere for transmitting a force to the thin plate. The pressure-sensitive sensor applies the force on the sphere to the composite piezoelectric sheet through the thin plate, converts a change in this force to an electric signal, and measures a pressure applied to the sphere. In this pressure-sensitive sensor, a through hole into which the sphere is fitted is formed in the opposed wall section of the receiving case facing the thin plate so that part of the sphere faces outside. With this structure, positioning of the sphere is achieved by the through hole in the opposed wall section with the sphere being in contact with the thin plate.

However, the sensor element in this pressure-sensitive sensor is energized against the sphere through the thin plate by a spring. Thus, the sphere is strongly abutted onto the edge of the through hole in the receiving case. For this reason, when a force in a direction other than the direction orthogonal to the thin plate is transmitted to the thin plate through the sphere, most of the force (force including even the force in the direction other than the direction orthogonal to the thin plate) is measured. Then, there was a problem that the force applied to the direction orthogonal to the thin plate could not be accurately measured.

An object of the present invention is to provide a semiconductor force sensor that can prevent an undue force from being applied to a diaphragm section therein, and thus can prevent the diaphragm section being broken.

Another object of the present invention is to provide a semiconductor force sensor that can accurately measure a force applied to a direction orthogonal to the diaphragm section.

DISCLOSURE OF THE INVENTION

A semiconductor force sensor of which the present invention aims at improvement includes a semiconductor force sensor element having a diaphragm section provided with a converting section for converting a change in a force to a change in an electric signal by piezoresistive effect, force transmitting means for applying the force to be measured to the diaphragm section of the semiconductor force sensor element, and a force transmitting means positioning structure. The force transmitting means positioning structure includes an opposed wall section spaced from the diaphragm section and arranged to face the diaphragm section, and positions and arranges the force transmitting means so as to bring the force transmitting means into direct contact with the central portion of the diaphragm section. Then, the force transmitting means is constituted by a sphere having rigidity. In the present invention, a through hole passing through the opposed wall section in a direction toward the diaphragm section is formed in the opposed wall section of the force transmitting means positioning structure at a position facing the central portion of the diaphragm section. This through hole is so shaped that a part of the sphere faces an outside of the opposed wall section and receives a part of the remainder of the sphere so that the sphere can move only in a direction orthogonal to the diaphragm section and can rotate on the central portion of the diaphragm section.

In a more specific configuration, a semiconductor force sensor of the present invention includes a semiconductor force sensor element including a diaphragm section having a converting section for converting a change in a force into a change in an electric signal by piezoresistive effect, a sphere having rigidity for applying the force to be measured to the diaphragm section of the semiconductor force sensor element, a case main body having one open surface, a lid member, and a through hole formed in the lid member. The case main body having one open surface includes an opening in the one surface, and includes a sensor element supporting section for supporting the semiconductor force sensor element at a position facing the opening so that deformation of the diaphragm section is allowed. The lid member includes an opposed wall section facing the diaphragm section of the semiconductor force sensor element supported by the sensor element supporting section and fixed to the case main body so as to close the opening. The through hole is formed in the opposed wall section and receives the sphere. Then, the through hole is so shaped that a part of the sphere faces the outside of an opposed wall section and receives a part of the remainder of the sphere so that the sphere can move only in a direction orthogonal to the diaphragm section and can rotate on the central portion of the diaphragm section, with the sphere being in direct contact with the central portion of the diaphragm section.

When the through hole in the opposed wall section is formed as in the present invention and a force in the direction orthogonal to the diaphragm section is applied to the sphere, the diagram section warps due to the force applied to the sphere. On contrast therewith, when a force in a direction other than the direction orthogonal to the diaphragm section is applied to the sphere, the sphere rotates on the central portion of the diaphragm section due to a component force. Application of an undue force to the diaphragm section thus can be prevented. For this reason, breakage of the diaphragm section can be prevented. Further, only the component of the force applied to the direction orthogonal to the diaphragm section can be accurately measured.

The diaphragm section can be formed to have a front surface with the converting section formed thereon and a back surface located opposite to the front surface. Further, the semiconductor force sensor element can be formed to have a cylindrical base section integrally formed with the periphery of the back surface of the diaphragm section. In this case, it is preferable that the sphere is so arranged that a force is applied to the surface of the diaphragm section. With this arrangement, measurement sensitivity can be enhanced. Incidentally, the force may be applied to the back surface of the diaphragm section by bringing the sphere into contact with the back surface of the diaphragm section.

The through hole may be circular or rectangular. If the through hole is formed to be circular, it can be formed into various shapes. The through hole, for example, can be constituted by a first through hole portion located on a side of the diaphragm section and at a position corresponding to the lower half of the sphere, a second through hole portion located on a side of the outside, and a third through hole portion located between the first through hole portion and the second through hole portion. In this case, it can be so configured that the first through hole portion has a constant diameter size slightly larger than the diameter of the sphere, the second through hole portion has a constant diameter size allowing the part of the sphere to be exposed to the outside from the second through hole portion, and the third through hole portion is so shaped that a diameter size thereof decreases more toward the second through hole portion from the first through hole portion along the outer surface of the sphere. If the through hole is formed as described above, the sphere rotates along the third through hole portion, so that rattling of the sphere within the through hole can be prevented.

Alternatively, the through hole can be constituted by a first through hole portion located on the side of the diaphragm section and second through hole portion located on the side of the outside. In this case, the first through hole portion can be configured to have a constant diameter size slightly larger than the diameter of the sphere. Further, the second through hole portion can be configured to be so shaped that a diameter size thereof gradually decreases toward the outside so as to allow the part of the sphere to be exposed to the outside from the second through hole portion. If the through hole is formed as described above, the through hole can be easily formed by simple machining.

The semiconductor force sensor element can be arranged by joining the base section to the sensor element supporting section of the case main body. In this case, it is preferable that a gel-like protective agent having electrically insulating property is filled in the case main body so as to cover the diaphragm section. With this arrangement, it becomes easy for the sphere to rotate on the central portion of the diaphragm section due to the lubricating property of the gel-like protective agent. Incidentally, in order to improve the warp of the diaphragm section caused by the sphere, it is preferable that penetration of the gel-like protective agent is so defined that the sphere pushes away the gel-like protective agent on the diaphragm section to cause the sphere to substantially come in direct contact with the central portion of the diaphragm section.

The case main body can include a bottom wall section constituting the sensor element supporting section, a peripheral wall section with one end thereof integrally formed with the peripheral edge portion of the bottom wall section and the other end thereof formed to surround the opening, and a plurality of fitting protrusions provided on the other end of the peripheral wall section, and can be integrally formed of an electrically insulating resin material. Further, the lid member can include a plurality of through holes for being fitted, through which a plurality of fitting protrusions of the case main body pass, and can be integrally formed of an electrically insulating resin material. With this arrangement, the lid member can be easily fixed to the case main body just through thermal deformation of leading edge portions of the plurality of fitting protrusions protruding from the lid member with the plurality of fitting protrusions of the case main body fitted into the plurality of through holes for being fitted in the lid member.

In such a case, it is preferable that a plurality of recess portions or stepped portions for receiving the fitting protrusions thermally deformed are formed around the plurality of through holes for being fitted in the lid member so as not to cause thermally deformed raised portions to protrude outwardly from the lid member.

A pair of recess portions being open outwardly and toward the other end of the peripheral wall section can be formed at the pair of opposed locations facing each other in the outer wall portion of the peripheral wall section. A pair of positioning protrusions extending from the opposed wall section toward the case main body and being fitted into the pair of recess portions described before can be integrally formed with the lid member. With this arrangement, just by fitting the pair of positioning protrusions of the lid member into the pair of recess portions in the case main body, positioning of the lid member relative to the case main body can be easily performed.

The case main body and the lid member can be formed of various materials. The case main body and the lid member can be respectively formed of ceramics, for example. With this arrangement, the operating temperature range of the case main body and the lid member can be expanded. Alternatively, the case main body can be formed of the ceramics, and the lid member can be formed of a metal. With this arrangement, the operating temperature range of the case main body can be expanded. If the lid member is formed of the ceramics or the metal, the through hole can be easily formed in the lid member just by applying simple machining such as press punching.

Preferably, a communicating passage for communicating a space bordered by the base section and the diaphragm section with the outside of the case main body is formed in the case main body. If such a communicating passage is formed, the space bordered by the base section and the diaphragm section is placed at atmospheric pressure, so that the warp of the diaphragm section becomes easier.

The semiconductor force sensor according to the present invention can be applied to a surface-mount type semiconductor force sensor. If it is applied to the surface-mount type semiconductor force sensor, the surface-mounting area of the semiconductor force sensor can be reduced. In addition, there is an advantage that no terminals are bent due to an external force, or the like.

BRIEF DESCRIPTION OF THE DRAWINGS

FIGS. 6(A) and (B) are sectional views showing the vicinity of the through holes of semiconductor force sensors according to other embodiments of the present invention.

BEST MODE FOR CARRYING OUT THE INVENTION

Figure 1:
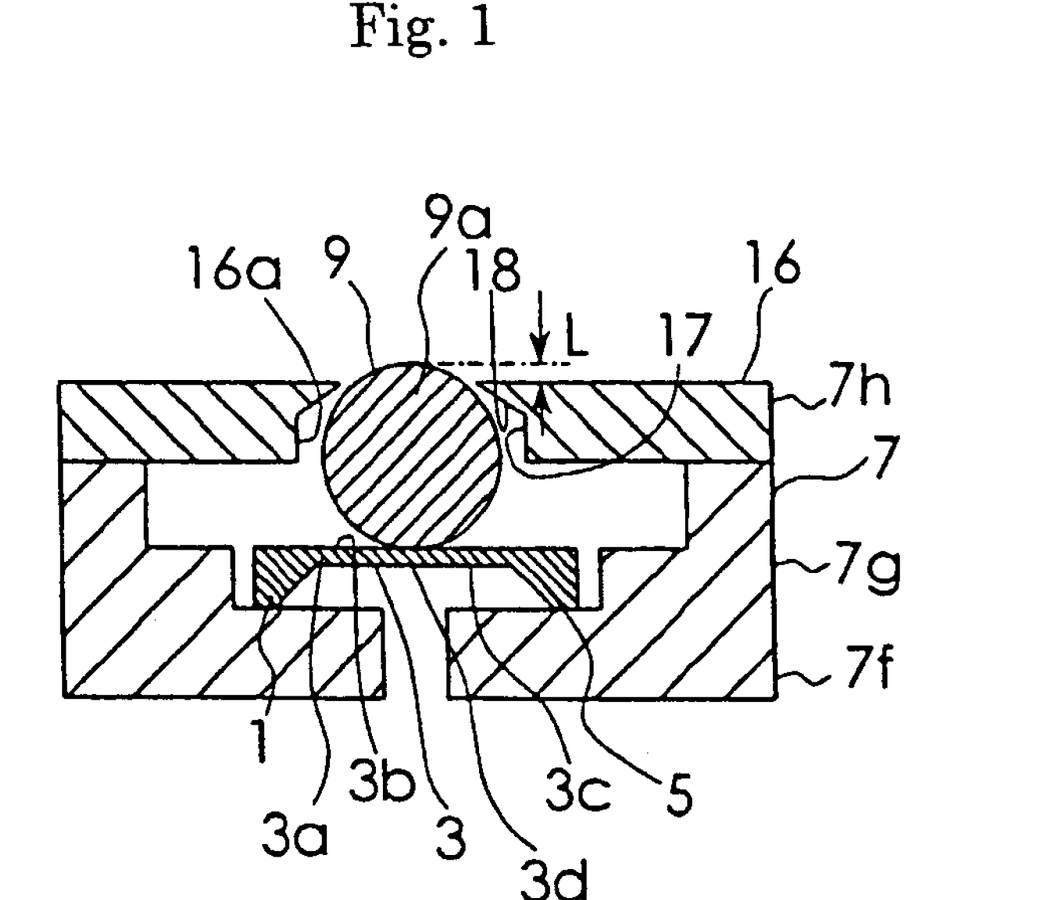
FIG. 1 is a schematic sectional view of a semiconductor force sensor according to a first embodiment of the present invention.

Embodiments of the present invention will be described in detail with reference to the accompanying drawings. FIG. 1 is a schematic sectional view of a semiconductor force sensor according to a first embodiment of the present invention. Referring to FIG. 1, a semiconductor force sensor element 1 is formed using a Silicon semiconductor substrate with an area of 2.3 mm square and a thickness of 300 μm, for detecting a force. At the center of the semiconductor substrate is formed a diaphragm section 3, and its periphery is supported by a base section 5 integral with the diaphragm section 3. The diaphragm section 3 has a converting section 3a on its front surface portion 3b. The converting section 3a comprises four diffusion resistances constituting a bridge circuit formed in the semiconductor substrate. The diffusion resistances convert a force applied to the converting section 3a into an electric signal by piezoresistive effect. The diaphragm section 3 is a silicon diaphragm constituted by the bottom of a recess section formed by etching from the back surface of the semiconductor substrate. The base section 5 is identified as a portion that has remained after etching for forming the diaphragm section 3 in the semiconductor substrate. The base section 5 supports the periphery of the diaphragm section 3, and a plurality of connecting electrodes connected to the resistance bridge circuit are formed on its surface. The resistances of the resistance bridge circuit are connected to an external circuit through the connecting electrodes, not shown. After the resistances are formed, the surface of the semiconductor force sensor element 1 is covered with an electrical insulation film for protection.

Force transmitting means 9 is intended to transmit a force to be measured to the diaphragm section 3 of the semiconductor force sensor element 1. The force transmitting means 9 is formed of a metal sphere. In this embodiment, it is necessary to arrange the force transmitting means 9 so that the center of gravity of the force transmitting means 9 formed of the sphere is located above a center 3d of the diaphragm section 3 of the semiconductor force sensor element 1 (or so that the center of the force transmitting means 9 formed of the sphere is located on a virtual orthogonal line orthogonal to the front surface of the diaphragm section 3). Referring to FIG. 1, for explanation, illustration is made so that there is a comparatively large space between the inner wall surface of a through hole 16a formed in a guide member 16 for guiding the force transmitting means 9 and the outer surface of the force transmitting means 9 formed of the sphere. In actual use, however, the guide member 16 constituting the structure of mounting the force transmitting means is so structured that when a force is applied to the force transmitting means 9 formed of the sphere at a predetermined angle with the virtual orthogonal line described before, the force transmitting means 9 is rotated by a component force directed in a direction not along the virtual orthogonal line described before, and that the force transmitting means 9 formed of the sphere moves along the virtual orthogonal line by a component force directed in a direction along the virtual orthogonal line. Specifically, if the diameter of the force transmitting means 9 formed of the sphere is 1 mm, the limit for the amount of motion of the force transmitting means 9 formed of the sphere is approximately 100 μm under application of the force of 5 kgf. If the amount of motion is restricted to such a level, the diaphragm section is not destroyed, and the relationship between force conversion and a change in output becomes more linear (rectilinear). Normally, the amount of motion becomes approximately 15 μm under application of the force of 500 gf.

When no force is applied to the force transmitting means 9, theoretically, the force transmitting means 9 is in point contact with the diaphragm section 3. Accordingly, if the force transmitting means 9 is positioned with good accuracy, a load acts only on the central portion 3d of the diaphragm section 3 of the semiconductor force sensor element 1. When the force is applied to the force transmitting means 9, the diaphragm section 3 deforms. However, the force transmitting means 9 does not substantially deform. Accordingly, the rigidity of the force transmitting means 9 is selected so that an output characteristic becomes as close to a straight line as possible.

In this embodiment, by appropriately determining a protruding length L (approximately 100 μm) of the spherical force transmitting means 9 that protrudes from the through hole 16a of the guide member 16, the amount of motion of the force transmitting means 9 to the diaphragm section 3 can be restricted.

A portion 17 of the through hole 16a formed in the guide member 16 on the side of the diaphragm section 3 has a cylindrical shape, and a portion 18 outside it has a shape of a truncated cone. Incidentally, with no force practically applied to the force transmitting means 9, the inner wall surface of the portion 18 is in contact with the outer surface of the force transmitting means 9. The portion 18 having the shape of the truncated cone functions to prevent the spherical force transmitting means 9 from coming out of the through hole 16a.

It can be seen that the contact surface of the force transmitting means 9 is preferably a quadratic curved surface, as in the spherical force transmitting means shown in FIG. 1.

In the embodiment in FIG. 1, a load from the direction of a side of the front surface portion 3b is applied to the diaphragm section 3 through the transmitting means, so that the diaphragm section 3 deforms. An output voltage that changes linearly with respect to a change in the load can be thereby obtained.

FIGS. 2(A) to 2(D) are a cutaway top view, a back view, a cutaway front view, and a cutaway right side view of a semiconductor force sensor in a second embodiment of the present invention applied to a surface-mount type semiconductor force sensor. As shown in the respective drawings, the semiconductor force sensor in this embodiment includes a semiconductor force sensor element 31, a sphere 33 constituting the force transmitting means, and a case 35. The semiconductor force sensor element 31 is formed using a Silicon semiconductor substrate with an area of 2.3 mm square and a thickness of 300 µm, and includes a diaphragm section 37 and an annular base section 39 integrally formed with the periphery of the diaphragm section 37. On the front surface of the diaphragm section 37 is formed a converting section for converting a change in a force into a change in an electric signal by piezoresistive effect. The base section 39 is joined to a sensor element supporting section 48 for the case 35, so that the semiconductor force sensor element 31 is received within the case 35.

The sphere 33 is formed of a metal ball having rigidity and constitutes the force transmitting means for applying a force to be measured to the diaphragm section 37 of the semiconductor force sensor element 31. The sphere 33 is in direct contact with the central portion of the diaphragm section 37 of the semiconductor force sensor element 31 so that the force can be directly applied to the diaphragm section 37.

The case 35 includes a case main body 41 and a lid member 43 fixed to the case main body 41. The case main body 41 is formed of a resin and has a shape of a box having one open surface with an opening 45 therein. This case main body 41 includes a nearly rectangular bottom wall section 47 and a peripheral wall section 49 integrally formed with the peripheral edge portion of the bottom wall section 47. To the bottom wall section 47, six terminals 51 are so fixed that the respective three of the terminals protrude from both sides of the semiconductor force sensor element 31 in a longitudinal direction thereof. Most of the terminals 51 are buried inside the bottom wall section 47 and have cream soldering surfaces 51a exposed to the outside so that the semiconductor force sensor can be surface mounted on a circuit substrate. In this embodiment, the case main body 41 was formed by injection molding with the six terminals 51 used as inserts. Incidentally, six holes 47a that pass through the bottom wall section 47 are the holes from which pins for supporting the six terminals 51 within a mold have come off when the case main body 41 is injection molded. In the bottom wall section 47, a communicating passage 47b for communicating a space bordered by the base section 39 and the diaphragm section 37 of the semiconductor force sensor element 31 with the outside of the case main body 41 is so formed as to pass through the bottom wall section 47. The bottom wall section 47 includes in its central portion the sensor element supporting section 48 to which the semiconductor force sensor element 31 is joined. With the base section 39 joined to the sensor element supporting section 48 as described above, a gel-like protective agent formed of silicone with electrically insulating property is filled in the case main body 41 so as to cover the diaphragm section 37. The penetration of the gel-like protective agent 50 is so defined that the sphere 33 pushes away the gel-like protective agent 50 on the diaphragm section 37 to substantially come in direct contact with the central portion of the diaphragm section 37. In this embodiment, this penetration is defined to be approximately 65, and its elastic modulus is defined to be approximately $1 \times 10^{-5}$ N/m². At a pair of opposed outer wall positions, facing each other, of the peripheral wall section 49, a pair of recess sections 53, which are open outwardly and toward the other end of the peripheral wall section 49, is formed. A pair of positioning protruding sections 57 of the lid member 43, which will be described later, are engaged with the pair of the recess sections 53.

Figure 2:
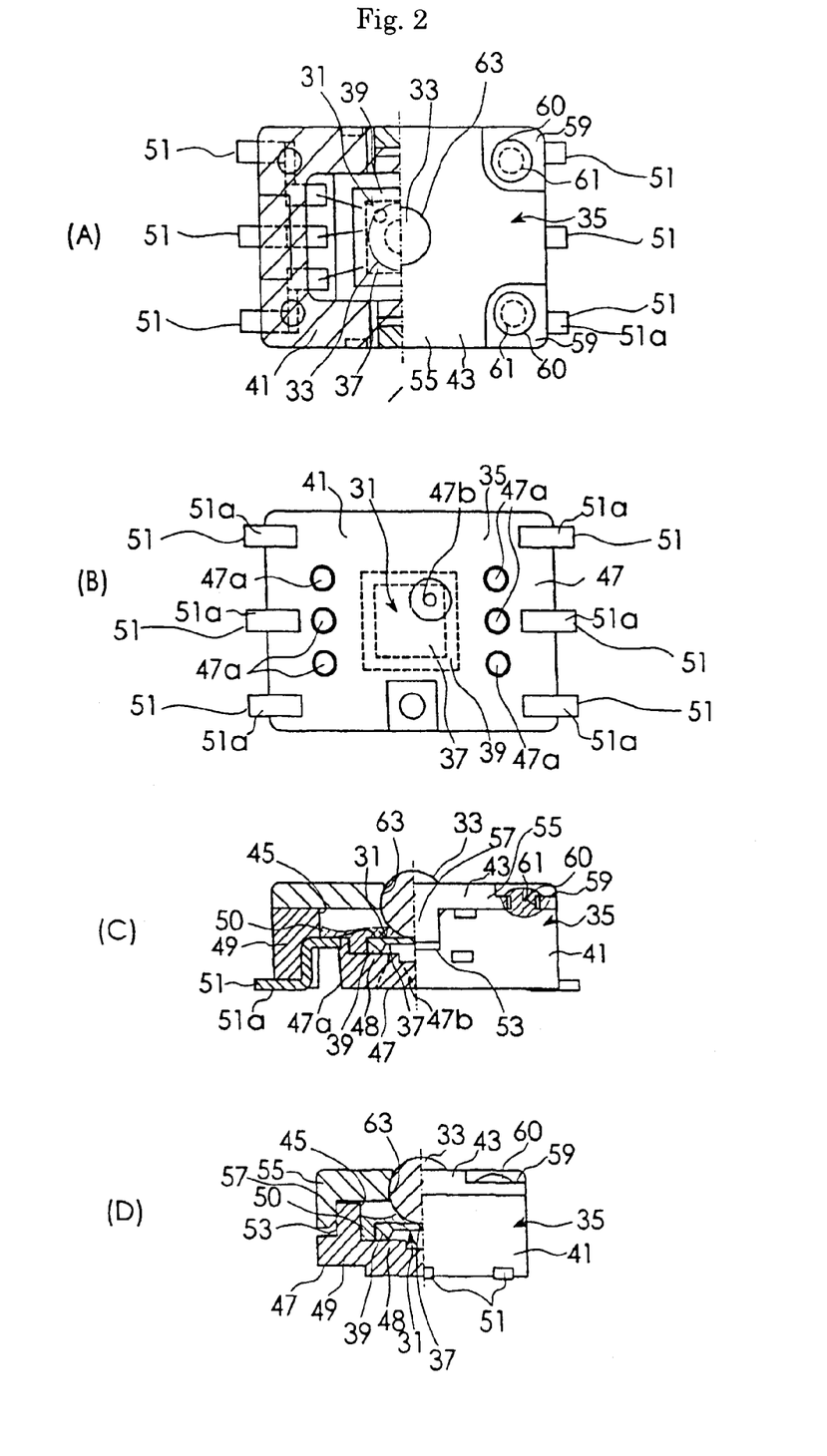
FIGS. 2(A) to 2(D) are a cutaway top view, a back view, a cutaway front view, and a cutaway right side view of a semiconductor force sensor according to a second embodiment of the present invention.
Figure 3:
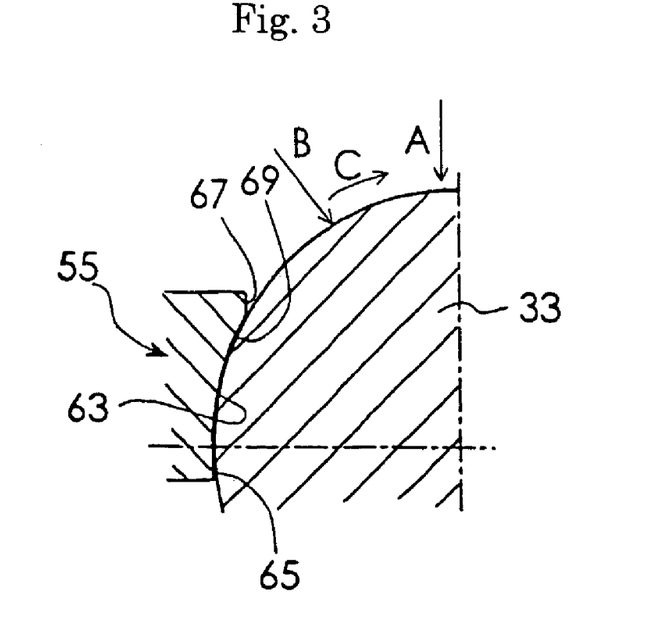
FIG. 3 is a sectional view showing the vicinity of the through hole of the semiconductor force sensor shown in FIG. 2.

The lid member 43 includes an opposed wall section 55 shaped like a rectangular plate, arranged to face the diaphragm section 37 and the pair of positioning protruding sections 57 that protrude from the opposed wall section 55, all of which are integrally formed of a synthetic resin. The pair of positioning protruding sections 57 extend from the center of the longer sides of the opposed wall sections 55 to the case main body 41 to be engaged with the recess sections 53 of the case main body 41. The opposed wall section 55 has four recess portions or stepped portions 59 formed by reducing the thickness of the opposed wall section 55 at its four corners. Substantially at the centers of the four stepped portions 59 are formed four fitted through holes 61, respectively. The lid member 43 is fixed to the case main body 41 by thermal adhesion sections 60. These thermal adhesion sections 60 are formed by thermally deforming the leading edge portions of four fitting protrusions that protrude from the lid member 43 with the four fitting protrusions formed in the case main body 41 fitted into the four fitted through holes 61. At a position facing the central portion of the diaphragm section 37 of the opposed wall section 55, a through hole 63 for receiving the sphere 33 is formed. As shown in FIG. 3 in detail, the through hole 63 is constituted by a first through hole portion 65 on the side of the diaphragm section 37, a second through hole portion 67 located outside, and a third through hole portion 69 between the first through hole portion 65 and the second through hole portion 67. The first through hole portion 65 is formed at a position corresponding to the lower half of the sphere 33 and has a constant diameter slightly larger than the diameter of the sphere 33. The second through hole portion 67 has a constant diameter size that allows part of the sphere 33 to be exposed to the outside from the second through hole portion 67. The third thorough hole portion 69 is so shaped that the diameter size thereof decreases more toward the second through hole portion 67 from the first through hole portion 65 along the outer surface of the sphere. The sphere 33 is positioned within the case 35 so that by being received in the through hole 63, part of the sphere 33 faces the outside of the opposed wall section 55 through the through hole and the sphere 33 can move only in a direction orthogonal to the diaphragm section 37 and can rotate on the central portion of the diaphragm section 37, with the sphere 33 in direct contact with the central portion of the diaphragm section 37. As with this embodiment, the through hole provided with the through hole portion(third through hole portion 69) shaped along the outer surface of the sphere is suitable in the case where the lid member 43 is formed of a flexible synthetic resin. If the through hole 63 is formed to have a shape as in this embodiment, the sphere 33 rotates along the third through hole portion 69. Thus, the sphere 33 can be prevented from rattling within the through hole 63.

In the semiconductor force sensor in this embodiment, when a force in a direction orthogonal to the diaphragm section 37 (indicated by an arrow A) is applied to the sphere 33, the diagram section 37 warps due to the force applied to the sphere 33. On contrast therewith, when a force in a direction other than the direction orthogonal to the diaphragm section 37, (indicated by an arrow B), is applied to the sphere 33, the sphere 33 rotates (in the direction indicated by an arrow C) on the central portion of the diaphragm section 37 due to a component force. Application of an undue force to the diaphragm section 37 thus can be prevented. For this reason, breakage of the diaphragm section 37 can be prevented. Further, only the component of the force applied to the direction orthogonal to the diaphragm section 37 can be accurately measured.

Figure 4:
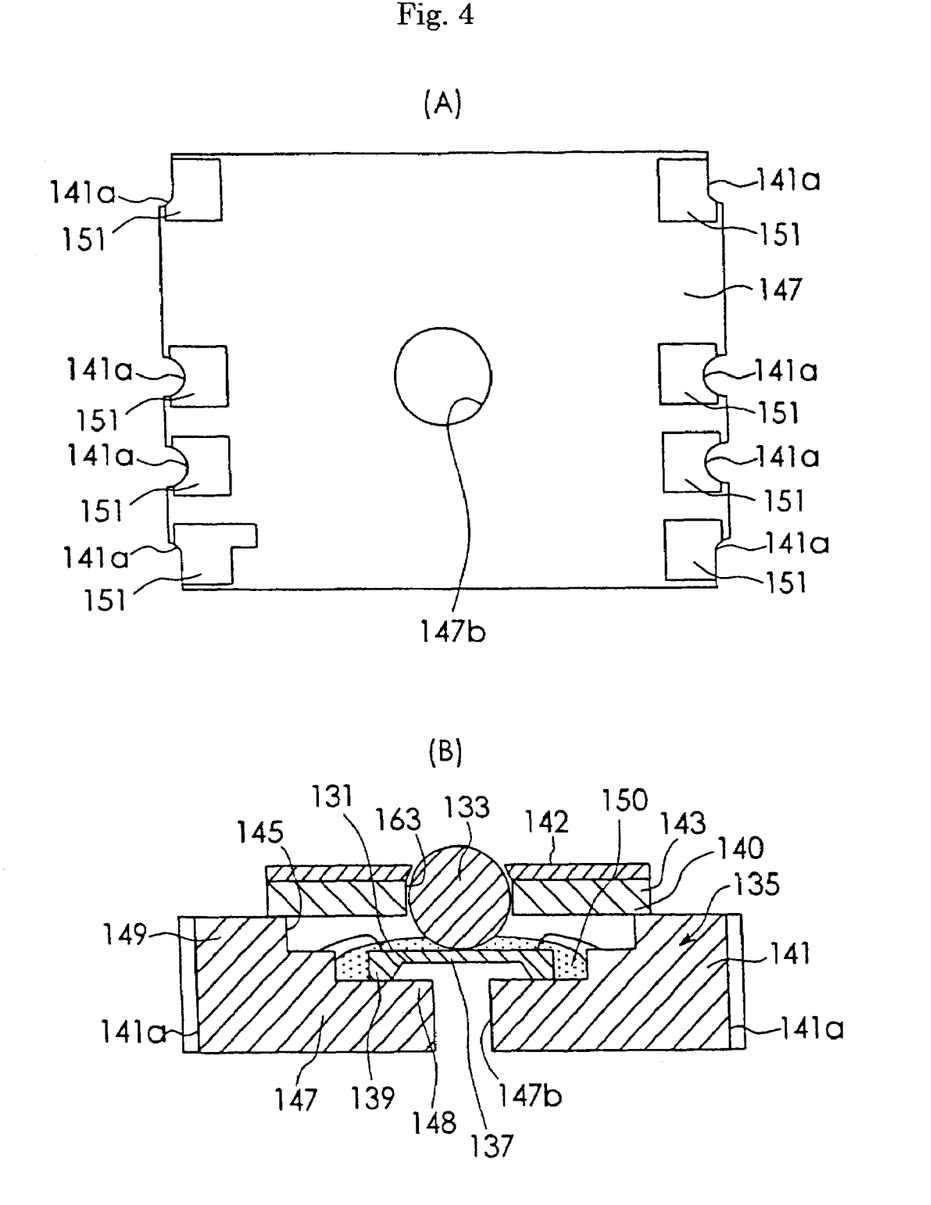
FIGS. 4(A) and 4(B) are a back view and a sectional view of a semiconductor force sensor according to a third embodiment of the present invention.

FIGS. 4(A) and 4(B) are a back view and a sectional view of a semiconductor force sensor according to a third embodiment of the present invention applied to a surface mounted type semiconductor force sensor. This embodiment includes the same structure as the semiconductor force sensor shown in FIG. 2, except for the structure of the case. Accordingly, in this drawing, reference numerals added by 100 are assigned to the members that are the same as those of the semiconductor force sensor in FIG. 2, and their descriptions will be thereby omitted.

As shown in these figures, a case 135 includes a case main body 141 and a lid member 143 fixed to the case main body 141. The case main body 141 is formed of ceramics and has a shape of a box having an opening 145 in one surface thereof. This case main body 141 includes a bottom wall section 147 and a peripheral wall section 149 integrally formed with the peripheral edge portion of the bottom wall section 147. On the back surface of the bottom wall section 147, eight terminals 151 are formed of a metal film so that the four of the terminals are arranged each at either edge of a semiconductor force sensor element 131 in a longitudinal direction thereof. The eight terminals 151 are electrically connected to the converting section on the front surface of the diaphragm section via conductive sections formed in grooves 141a that extend vertically at both opposed sides of the case main body 141 in the longitudinal direction thereof. In the bottom wall section 147, a communicating passage 147b for communicating a space bordered by a base section 139 and a diaphragm section 137 of a semiconductor force sensor element 131 with the outside of the case main body 41 is so formed as to pass through the bottom wall section 147. The bottom wall section 147 includes in its central portion sensor element supporting section 148 to which the semiconductor force sensor element 131 is joined. With the base section 139 joined to the sensor element supporting sections 148 as described above, a gel-like protective agent 150 formed of silicone with electrically insulating property is filled in the case main body 141 so as to cover the diaphragm section 137.

Figure 5:
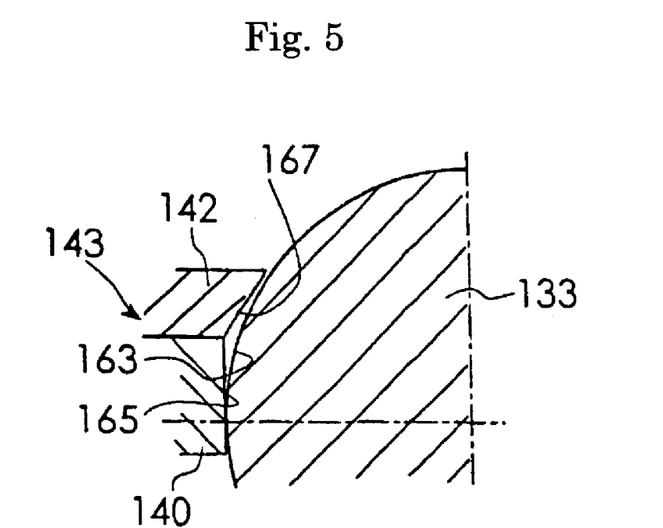
FIG. 5 is a sectional view showing the vicinity of the through hole of the semiconductor force sensor shown in FIG. 4.

The lid member 143 constitutes an opposed wall section shaped like a rectangular plate, arranged to face the diaphragm section 137, and is formed by lamination of a second lid plate member 142 on a first lid member 140. The first lid plate member 140 and the second lid plate member 142 are both formed of the ceramics or a metal and have a rectangular shape. As shown in FIG. 5 in detail, a first through hole portion 165 formed passing through the central portion of the first lid plate member 140 and a second through hole portion 167 formed passing through the central portion of the second lid plate member 142 form a through hole 163 for receiving a sphere 133. The first through hole portion 165 has a constant diameter size slightly larger the diameter of the sphere 133. The second through hole portion 167 is so shaped that the diameter size thereof gradually decreases toward the outside so as to allow part of the sphere 133 to be exposed to the outside from the second through hole portion 167. The through hole in this embodiment is suitable for the case where the lid members are formed of the ceramics or the metal with high hardness. If the first through hole portion 165 is formed in the first lid plate member 140 and the second through hole portion 167 is formed in the second lid plate member 142 as described above, the first through hole portion 165 and the second through hole portion 167 can be easily formed with accurate dimensions, even if the lid member 143 is formed using the ceramics or the metal with high hardness. Further, if at least one of the case main body 141 and the lid member 143 is formed of the ceramics, the operating temperature range of the case main body or the lid member can be expanded.

Figure 6:
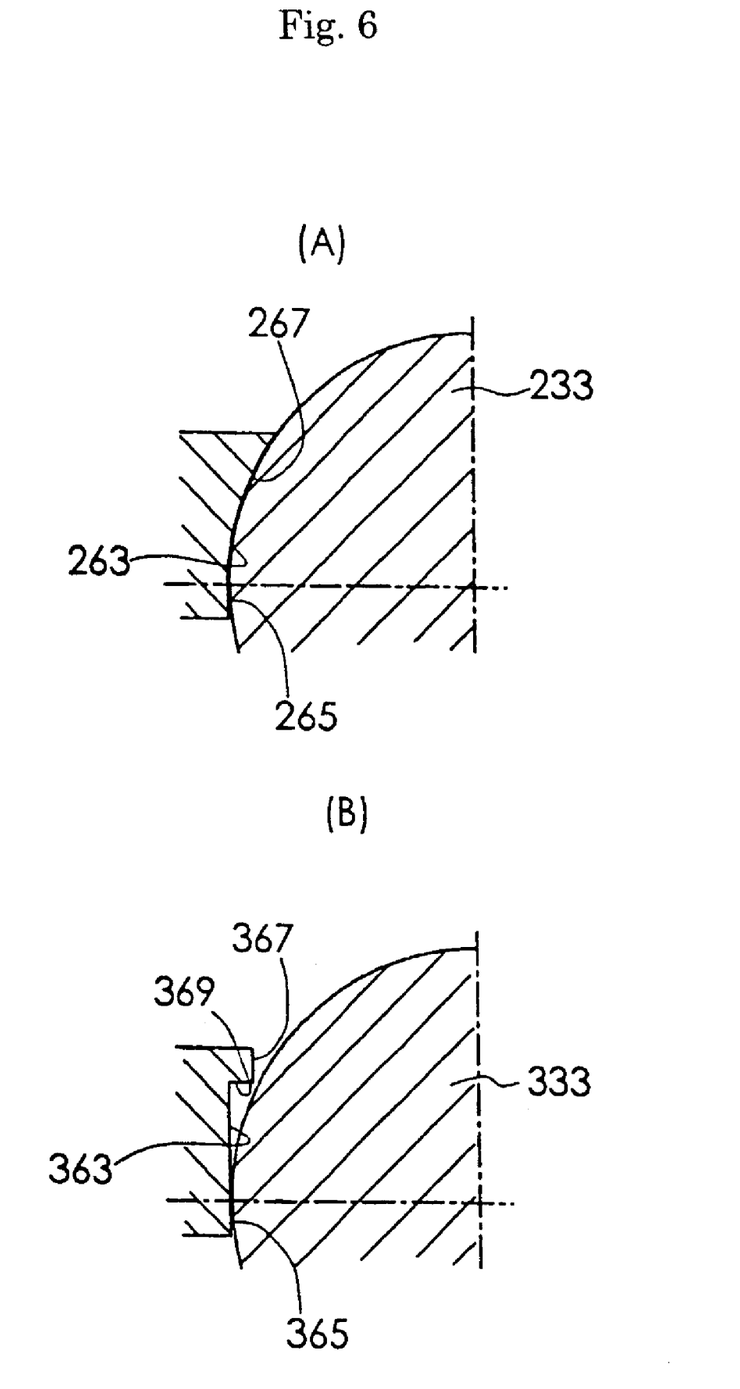

As shown in FIGS. 6(A) and 6(B), various shapes can be adopted as the shape of the through hole. A through hole 263 shown in FIG. 6(A) is constituted by a first through hole portion 265 located on the side of the diaphragm section, and a second through hole portion 267 located outside. The first through hole portion 265 is formed at a position corresponding to the lower half of a sphere 233 and has a constant diameter size slightly larger than the diameter of the sphere 233. The second through hole portion 267 is so shaped that the diameter size thereof decreases more toward the outside along the outer surface of the sphere 233 so as to allow part of the sphere 233 to be exposed to the outside. The through hole in this embodiment is suitable when the lid members are formed of the flexible synthetic resin as described before. In this embodiment, the portion (second through hole portion 267) of the through hole 263 of which the diameter size decreases more toward the outside along the outer surface of the sphere 233 is formed in a wider range than in the through hole 63 shown in FIG. 2. Thus, rattling of the sphere 233 can be prevented more than in the example shown in FIG. 2.

A through hole 363 shown in FIG. 6(B) is constituted by a first through hole portion 365 located on the side of the diaphragm section, a second through hole portion 367 located outside, and a third through hole portion 369 located between the first through hole portion 365 and the second through hole portion 367. The first through hole portion 365 has a constant diameter size slightly larger than the diameter of the sphere 333. The second through hole portion 367 has a constant diameter size that allows part of the sphere 333 to be exposed to the outside from the second through hole portion 367. The third through hole portion 369 has an annular shape orthogonal to the first through hole portion 365 and the second through hole portion 367. The through hole in this embodiment is suitable for the case where the lid member is formed of the ceramics or the metal with high hardness. In this embodiment as well, as in the through hole 163 shown in FIG. 5, the first through hole portion 365 and the second through hole portion 367 can be easily formed with accurate dimensions even if the lid members are formed using the ceramics or the metal with high hardness.

INDUSTRIAL APPLICABILITY

According to the present invention, even if a force in a direction other than a direction orthogonal to the diaphragm section is applied to the sphere, breakage of the diaphragm section can be prevented since no undue force is applied to the diaphragm section. Further, only the force applied in the direction orthogonal to the diaphragm section can be measured accurately.

What is claimed is:

1. A semiconductor force sensor comprising:
 a semiconductor force sensor element including a diaphragm section having a converting section for converting a change in a force into a change in an electric signal by piezoresistive effect;
 force transmitting means for applying the force to be measured to said diaphragm section of said semiconductor force sensor element, said force transmitting means being constituted by a sphere having rigidity; and
 a force transmitting means positioning structure having an opposed wall section spaced from said diaphragm section and arranged to face said diaphragm section, for positioning and arranging said force transmitting means so that said force transmitting means is brought into direct contact with a central portion of said diaphragm section, wherein a through hole passing through said opposed wall section in a direction toward said diaphragm section is formed in said opposed wall section of said force transmitting means positioning structure at a position facing said central portion of said diaphragm section;

said through hole is so shaped that a part of said sphere faces an outside of said opposed wall section therethrough and receives a part of a remainder of said sphere so that said sphere can move only in a direction orthogonal to said diaphragm section and can rotate on said central portion of said diaphragm section;

a side of said diaphragm section on which said sphere is located is covered with a gel-like protective agent having electrically insulating property; and penetration of said gel-like protective agent is so defined that said sphere pushes away said gel-like protective agent on said diaphragm section to substantially come in direct contact with said central portion of said diaphragm section.

* * * * *

UNITED STATES PATENT AND TRADEMARK OFFICE
CERTIFICATE OF CORRECTION

PATENT NO.        : 7,360,440 B2                                        Page 1 of 1
APPLICATION NO.   : 11/763844
DATED             : April 22, 2008
INVENTOR(S)       : Shigeru Hirose et al.

It is certified that error appears in the above-identified patent and that said Letters Patent is hereby corrected as shown below:

On the Title Page, Section 30, Foreign Application Priority Data, Add

--Apr. 12, 2002 (JP) 2002-111396

Oct. 18, 2002 (JP) 2002-305186--.

Signed and Sealed this

Twelfth Day of August, 2008

JON W. DUDAS
*Director of the United States Patent and Trademark Office*